July 8, 1952 R. K. WILSON 2,602,348
HAND CONTROL FOR AUTOMOTIVE VEHICLES
Filed Feb. 19, 1951
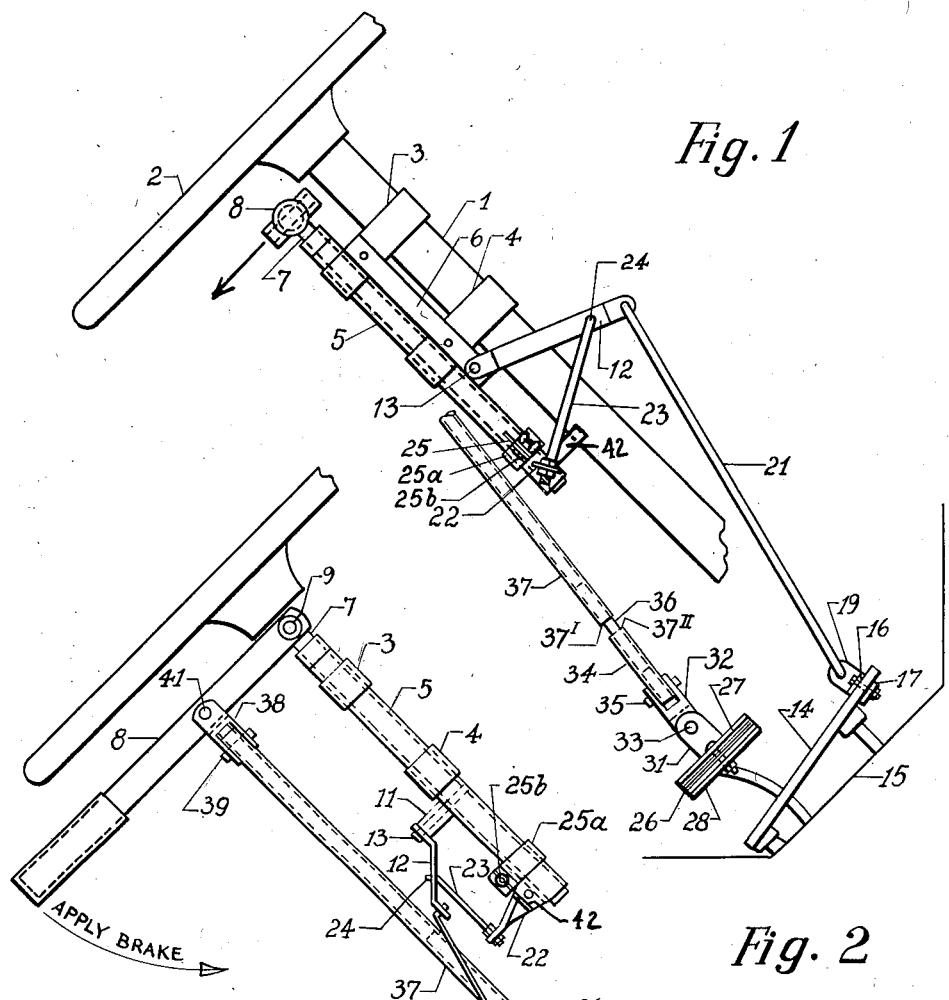
Fig. 1
Fig. 2
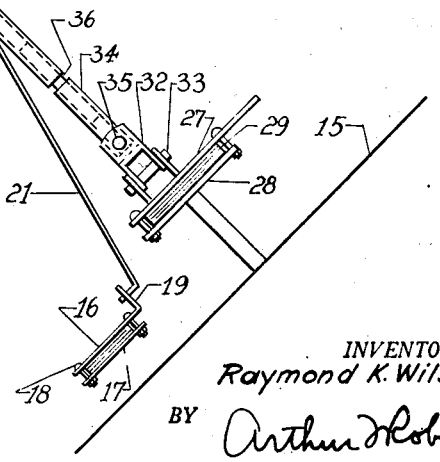
INVENTOR.
Raymond K. Wilson
BY Arthur Robert
ATTORNEY Patented July 8, 1952

2,602,348

UNITED STATES PATENT OFFICE 2,602,348

HAND CONTROL FOR AUTOMOTIVE VEHICLES

Raymond K. Wilson, Louisville, Ky.

Application February 19, 1951, Serial No. 211,707

6 Claims. (Cl. 74—484)

The present invention relates to a control mechanism for an automobile, to enable physically handicapped persons to drive, and relates in particular to a hand control mechanism for operating the so-called clutchless or hydraulic clutch type automobiles.

It is an object of the present invention to provide a hand control mechanism for an automobile which allows one hand to concurrently or independently control the throttle and brake.

Another object is the provision of a hand-operated control mechanism for an automobile which has a direct mechanical action so that it can be operated when the engine is not operated.

A further object is the provision of a hand-operated control which does not interfere with the usual foot control of the automobile.

These and other objects will be apparent upon consideration of the following description taken in connection with the accompanying drawing illustrating a preferred embodiment of the invention by way of example, and wherein:

Figure 1 is a side view with part broken away showing the invention applied to an automobile; and Figure 2 is a top view of Figure 1.

Referring to the drawing, Figure 1, there is illustrated the steering column 1 of an automobile in which is rotatably journalled the steering wheel 2 for guiding the automobile in known manner. A pair of clamps 3, 4 secured to the steering post carry a sleeve 5, and a bar 6 connects the two clamps and may be secured thereto by the clamp screws or in any other manner. Within sleeve 5 a control spindle 7 is mounted for rotatable movement and its upper end is flattened and receives the forked end of an operating handle 8 pivoted thereto by a pivot pin 9 passing through the handle and control spindle. The handle 8 may have a suitable hand grip thereon.

A spacer sleeve 11 extending laterally from bar 6 has an offset link 12 pivoted on the pivot pin 13. The accelerator pedal 14 is pivoted at one end to the floor board 15 and is connected in a known manner to the throttle valve of the engine. This pedal receives a pair of plates 16, 17 between which the pedal is clamped by screws 18 or the like, and the upper plate 16 carries a perforate lug or ear 19 to which is swivelled the bent or hooked lower end of rod 21, the upper end of the rod being bent, and being received in an eye in one end of link 12. Suitable provision may be made to prevent accidental uncoupling of rod 21 from link 12 and ear 19. Link 12 is suitably offset to avoid interference by the steering column. The lower end of spindle 7 carries an extension or arm 22 clamped thereon, and a rod 23 fastened on the extension has a hooked end 24 engaging in an eye in link 12.

From the foregoing it will be seen that when handle 8 is turned rearwardly as indicated by the arrow in Figure 1, spindle 7 turns therewith and carries a long rod 23 which thus pulls down the lower end of link 12 to depress rod 21 and thus depress the accelerator pedal. Conversely, when the handle 7 is turned forwardly, it brings forward the arm 22 to raise the lower end of link 12 and rod 21 to thus raise the accelerator pedal. The accelerator pedal may be held in position by any suitable friction means. As shown, the lower end of sleeve 5 has a slot 25 therein, and a clamping band 25a encircles this end and has a clamping screw and thumb nut 25b. This nut may be adjusted to compress the clamp and divided end of the sleeve to impose the desired resistance to turning of spindle 7 therein so that the accelerator pedal will be frictionally held in the desired position by the turning of spindle 7 and handle 8. Or, as the accelerator connection to the throttle valve usually includes a spring to raise the pedal and close the throttle valve, this spring action may be relied on to return the accelerator pedal, in which case the rod 23 may be replaced by a flexible cable, or the like.

The brake pedal 26 receives a pair of plates 27 and 28 between which the brake pedal is clamped by screws 29 or the like, and the brake pedal connects through an arm extending through the floor board to the vehicle brake mechanism in known manner. The upper plate 27 carries a clevis 31 at one side where it will not interfere with the operation of the brake pedal by an operator's foot. A double clevis member or gimbal 32 has its lower prongs fastened to clevis 31 by a pivot pin 33, and the upper prongs thereof receive a tubular socket 34 pivoted thereto by a pin 35, so that socket member 34 is secured to the pedal 26 by a universal or gimbal joint. Socket member 34 telescopically receives one end of a rod 36 slidably therein, the other end of the rod being secured, as by a pressed fit, in the lower end of a sleeve 37. The lower end 37' of sleeve 37 can abut the upper end 37'' of socket member 34 so as to limit telescopic movement of rod 36 into socket 34 in a downward direction.

The upper end of sleeve 37 carries a double clevis or gimbal 38 which is pivotally secured thereto at 39 and to operating handle 8 at 41, so that sleeve 37 also is coupled to operating handle 8 by a universal or gimbal joint. From the foregoing, it will be seen that to apply the brake, the handle 8 is pivoted downward about pivot 9 as indicated by the arrow in Figure 2, and this movement pushes sleeve 37 down against socket 34 which in turn pushes down the brake pedal. Also, when the handle 8 is turned, the distance between connections 41 and 33 may increase or decrease without operating the brake pedal because of the telescopic connection of rod 36 and socket 34. This also allows for torsional movement of sleeve 37 relative to socket 34.

The mechanism here described employs a single handle 8 for selectively operating the accelerator pedal or brake pedal, so that the control may be operated by a handicapped person. An important advantage of this mechanism is that it can be employed to simultaneously apply the brake and release the accelerator pedal, by pushing down the operating handle 8 and simultaneously turning the handle forwardly. It is also possible to position or control the throttle while simultaneously applying the brake, by pushing down on the handle 8 while simultaneously turning the handle rearwardly. This is of importance in controlling the automobile on a hill because the brake can be applied to hold the automobile against rearward movement and by rearwardly turning the handle so the engine can be accelerated sufficiently to begin to move the automobile forward, whereupon the brake can be released while the automobile moves forward.

Because the mechanism is directly connected by mechanical linkages to the brake and accelerator pedals, it does not require that the engine be in operation to control the brake. However, it will be understood that the invention may be applied to automobiles which incorporate a vacuum booster for the brake, as such systems allow the brake to be applied even when the engine is not operating.

It may be noted that the arm 22 carries an outwardly extending stop 42 which engages the steering column in the foremost portion of handle 8 to limit the forward movement of that handle.

Since the embodiment of applicant's invention as illustrated is arranged vertically, the specification and claims make use of direction indicating terms, such as up and down motion, for the sake of clarity and not for the purpose of limitation. It will be obvious to those skilled in this art that embodiments of applicant's invention may readily be arranged horizontally or otherwise.

I claim as my invention:

1. A hand-operated control for two pedals, such as the accelerator and brake pedals, of an automotive vehicle comprising: a spindle adapted to be mounted on the vehicle frame in the proximity of its steering column for turning movement about an upwardly extending axis; a hand lever connected to said spindle for turning it rearwardly and forwardly about said upward axis, said connection being a pivotal one to permit the hand lever to be pivotally moved upward and downward about said connection; means for connecting said spindle to one of said pedals for translating the turning movement of said spindle in one direction into vertical motion in one direction and for imparting such motion to said pedal; and means for connecting said hand lever to the other of said pedals for transmitting at least one of the upward and downward movements of said hand lever to said other pedal, said means including a rod adapted to extend from the proximity of the lever to the proximity of the pedal, said rod having upper and lower sections arranged for turning movement relatively to each other about the longitudinal axis of the rod, a universal joint connecting the upper portion of the rod to the lever and a universal joint for connecting the lower portion of the rod to said other pedal.

2. The control of claim 1 wherein said spindle and said first pedal connecting means comprises: an arm pivoted to said frame for up and down pivotal movement; means for connecting the arm to said pedal to impart the vertical movement of the arm in one direction to said pedal; and motion translating means connected to said spindle for translating the turning movement of said spindle in one direction into vertical motion in one direction and connected to said arm for imparting such motion to said arm.

3. The combination with an automotive vehicle having brake and accelerator pedals and a steering column, of a hand-operated control for said pedals comprising: a spindle mounted on the column for turning movement about an upwardly extending axis; a hand lever connected to the upper portion of said spindle for turning it rearwardly and forwardly about said upward axis, said connection being a pivotal one to permit the hand lever to be moved upwardly and downwardly about said connection; means connecting the lower portion of said spindle to said accelerator pedal for translating the turning movement of said spindle in one direction into vertical motion and for imparting such motion to said accelerator pedal; and means connecting said hand lever to said brake pedal for transmitting at least one of the upward and downward movements of said hand lever to said brake pedal, said means including a rod extending from the lever to the brake pedal, said rod having upper and lower sections arranged for turning movement relatively to each other about the longitudinal axis of the rod, a universal joint connecting the upper portion of the rod to the lever and a universal joint connecting the lower portion of the rod to the pedal.

4. A hand-operated control mechanism for the accelerator and brake pedals of an automotive vehicle comprising: a spindle adapted to be mounted on the steering column of the vehicle for turning movement about an upwardly extending axis; a hand lever pivotally connected to said spindle for turning the spindle; a connecting member adapted to be attached to the accelerator pedal; a linkage between the spindle and connecting member for converting turning movement of the spindle in one direction into downward movement of said connecting member; a second connecting member adapted to be attached to the brake pedal; and a telescopic link connected by gimbal joints to said hand lever and second connecting member, said latter link having limited downward telescopic movement.

5. A hand-operated control for two pedals, such as the accelerator and brake pedals, of an automotive vehicle, comprising: a longitudinal spindle; bracket means adapted for rigid securement to the vehicle frame and operative when secured to hold said spindle alongside the steering column of the vehicle and to support said spindle for angular movement about its long axis; a hand lever pivotally connected to the spindle for turning it angularly about its long axis, said lever being pivotally movable upward and downward about said connection; an arm connected to said bracket means for pivotal upward and downward movement; means connecting said spindle to said arm, said means being operative to translate the turning movement of said spindle in one direction into vertical movement in one direction and to impart such vertical movement to said arm; a rod connected to said arm and adapted for connection to one of said pedals, said rod being operative, when connected, to impart the said vertical movement of said arm in said one direction to said pedal; and mechanism connected to said hand lever and adapted for connection to said other pedal, said mechanism being operative, when connected, to transmit at least one of the upward and downward movements of said hand lever to said other pedal.

6. The control of claim 5 wherein said mechanism comprises: a rod adapted to extend from the proximity of the lever to the proximity of the other pedal; a universal joint connecting the rod to the lever at a point spaced from the pivotal connection of the lever to the spindle; and another universal joint secured to said rod and adapted for connection to said other pedal.

RAYMOND K. WILSON.

REFERENCES CITED

The following references are of record in the file of this patent:

UNITED STATES PATENTS

| Number | Name | Date |
|---|---|---|
| 931,770 | Krause | Aug. 24, 1909 |
| 1,403,390 | Ameron | Jan. 10, 1922 |
| 1,521,746 | Belden | Jan. 6, 1925 |
| 1,585,855 | Hawn | May 25, 1926 |
| 1,586,003 | Noble | May 25, 1926 |
| 1,721,290 | Badertsches | July 16, 1929 |
| 1,906,366 | Burns | May 2, 1933 |
| 2,202,551 | Guffey | May 28, 1940 |
| 2,226,591 | Swenson | Dec. 31, 1940 |
| 2,523,491 | Ruten | Sept. 26, 1950 |
| 2,548,240 | Reeder | Apr. 10, 1951 |

OTHER REFERENCES

Autocar Magazine, pages 96 and 97, January 31, 1947.